United States Patent
Frazier et al.

(10) Patent No.: US 10,838,857 B2
(45) Date of Patent: *Nov. 17, 2020

(54) MULTI-SECTION GARBAGE COLLECTION

(71) Applicant: International Business Machines Corporation, Armonk, NY (US)

(72) Inventors: Giles R. Frazier, Austin, TX (US); Michael Karl Gschwind, Chappaqua, NY (US); Younes Manton, Toronto (CA); Karl M. Taylor, Kanata (CA); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/832,207

(22) Filed: Dec. 5, 2017

(65) Prior Publication Data
US 2018/0095874 A1 Apr. 5, 2018

Related U.S. Application Data

(63) Continuation of application No. 14/809,852, filed on Jul. 27, 2015, now Pat. No. 10,223,257.

(51) Int. Cl.
*G06F 9/30* (2018.01)
*G06F 12/02* (2006.01)
*G06F 9/455* (2018.01)

(52) U.S. Cl.
CPC ...... *G06F 12/0253* (2013.01); *G06F 12/0261* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 6,085,289 A | 7/2000 | Thatcher et al. |
| 7,177,876 B2 | 2/2007 | Sankaran |
| 7,716,192 B2 | 5/2010 | Petrank et al. |
| 7,769,974 B2 | 8/2010 | Bhansali et al. |
| 7,849,293 B2 | 12/2010 | Blaner et al. |
| 8,135,915 B2 | 3/2012 | Dimpsey et al. |
| 8,396,999 B2 | 3/2013 | Vo et al. |
| 8,527,559 B2 | 9/2013 | Ylonen |
| 8,612,856 B2 | 12/2013 | Hotelling et al. |
| 8,612,956 B2 | 12/2013 | Maier et al. |
| 8,616,999 B2 | 12/2013 | Greaney et al. |

(Continued)

OTHER PUBLICATIONS

McDaniel, "An Analysis of a Mesa Instruction Set", Xerox Palo Alto Research Center, Jun. 1982, pp. 1-16.

(Continued)

*Primary Examiner* — William B Partridge
(74) *Attorney, Agent, or Firm* — Patterson + Sheridan, LLP

(57) ABSTRACT

A method and apparatus for garbage collection is disclosed herein. The method includes performing a garbage collection process without pausing execution of a runtime environment. The method also includes executing a first CPU instruction to load a first pointer that points to a first location in a first region of memory, where the first region of memory is undergoing garbage collection. The method also includes moving a first object pointed to by the first pointer from the first location in memory to a second location in memory.

20 Claims, 7 Drawing Sheets

(56) References Cited

U.S. PATENT DOCUMENTS

| | | |
|---|---|---|
| 8,782,104 B2 | 7/2014 | Bacon et al. |
| 9,251,066 B2 | 2/2016 | Colgrove et al. |
| 9,747,203 B2* | 8/2017 | Frazier ............... G06F 12/0253 |
| 2004/0139272 A1* | 7/2004 | Rodriguez-Rivera ...................... G06F 12/0253 711/100 |
| 2006/0248130 A1 | 11/2006 | Grarup et al. |
| 2007/0016633 A1 | 1/2007 | Lindholm et al. |
| 2007/0162526 A1 | 7/2007 | Printezis et al. |
| 2009/0327374 A1 | 12/2009 | Wright et al. |
| 2011/0208792 A1 | 8/2011 | Printezis et al. |
| 2011/0238922 A1 | 9/2011 | Hooker et al. |
| 2012/0144144 A1 | 6/2012 | Worthington et al. |
| 2012/0222005 A1 | 8/2012 | Harris et al. |
| 2014/0075163 A1* | 3/2014 | Loewenstein ....... G06F 9/30043 712/225 |
| 2016/0117114 A1 | 4/2016 | Heller, Jr. |
| 2017/0004074 A1* | 1/2017 | Frazier ............... G06F 12/0253 |
| 2017/0031812 A1 | 2/2017 | Frazier et al. |
| 2017/0031813 A1 | 2/2017 | Frazier et al. |
| 2017/0031814 A1 | 2/2017 | Frazier et al. |
| 2017/0031817 A1 | 2/2017 | Frazier et al. |
| 2017/0177472 A1* | 6/2017 | Frazier ............... G06F 12/0253 |

OTHER PUBLICATIONS

Siebert, "Concurrent, Parallel, Real-Time Garbage-Collection", ISMM'10, Jun. 5-6, 2010, ACM, 2010, pp. 1-10.

Weiss, "Garbage Collectors-Serial vs. Parallel vs. CMS vs. G1 {and what's new in Java 8)", Takipi Inc., Sep. 3, 2014, pp. 1-10 {accessed from http://blog.takipi.com/garbage-collectors-serial-vs-parallel-vs-cms-vs-th- e-gl-and-whats-newn- java-8/).

Detlefs, D., Flood, C., Heller, S., Printezis, T., "Garbage-First Garbage Collection", ISMM '04 Proceedings of the 4th International symposium on Memory management, pp. 37-48, 2004.

Oaks, S., "Java Performance: The Definitive Guide", Apr. 2014, O'Reilly Media, preview provided by Google Books, p. 150-155.

List of IBM Patents or Applications Treated as Related.

* cited by examiner

MULTI-SECTION GARBAGE COLLECTION

CROSS-REFERENCE TO RELATED APPLICATIONS

This application is a continuation of co-pending U.S. patent application Ser. No. 14/809,852, filed Jul. 27, 2015. The aforementioned related patent application is herein incorporated by reference in its entirety.

BACKGROUND

The present disclosure relates to embodiments for executing a garbage collection process on a memory block. More specifically, the embodiments relate to executing the garbage collection process while minimizing performance impact.

Garbage collection is an automatic memory management process that identifies objects in memory that are no longer being referenced and frees those objects. As memory objects of varying sizes are allocated and later freed, the memory in which they are stored becomes increasingly fragmented. Eventually, very few large free areas of memory exist, and it becomes difficult to store additional objects without increasing the memory size. When this occurs, a process within garbage collection, referred to as compaction, is employed in order to consolidate the allocated objects into one large area, leaving another large area of free space available for new objects. During consolidation, the memory objects that are still being referenced are moved from one area of memory to another area of memory.

Java virtual machines (JVM) and other runtime environments are a type of memory-managed applications that may occasionally perform a garbage collection operation on the area of memory used by the application. During a garbage collection operation, all other operations of the JVM typically cease, which significantly increases the response time of any transactions. This delay may cause problems for client devices accessing Java virtual machine.

SUMMARY

According to one embodiment, a method is disclosed herein. The method includes performing a garbage collection process without pausing execution of a runtime environment, executing a first CPU instruction to load a first pointer that points to a first location in a first region of memory, wherein the first region of memory is undergoing garbage collection, and moving a first object pointed to by the first pointer from the first location in memory to a second location in memory.

According to another embodiment, a system is disclosed herein. The system includes a processor and a memory. The memory stores program code, which, when executed on the processor, performs an operation. The operation includes performing a garbage collection process without pausing execution of a runtime environment, executing a first CPU instruction to load a first pointer that points to a first location in a first region of memory, wherein the first region of memory is undergoing garbage collection, and moving a first object pointed to by the first pointer from the first location in memory to a second location in memory.

According to yet another embodiment, a computer readable storage medium having stored thereon instructions that when executed by a processor causes a processor to perform an operation. The operation includes performing a garbage collection process without pausing execution of a runtime environment, executing a first CPU instruction to load a first pointer that points to a first location in a first region of memory, wherein the first region of memory is undergoing garbage collection, and moving a first object pointed to by the first pointer from the first location in memory to a second location in memory.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Figure 1:
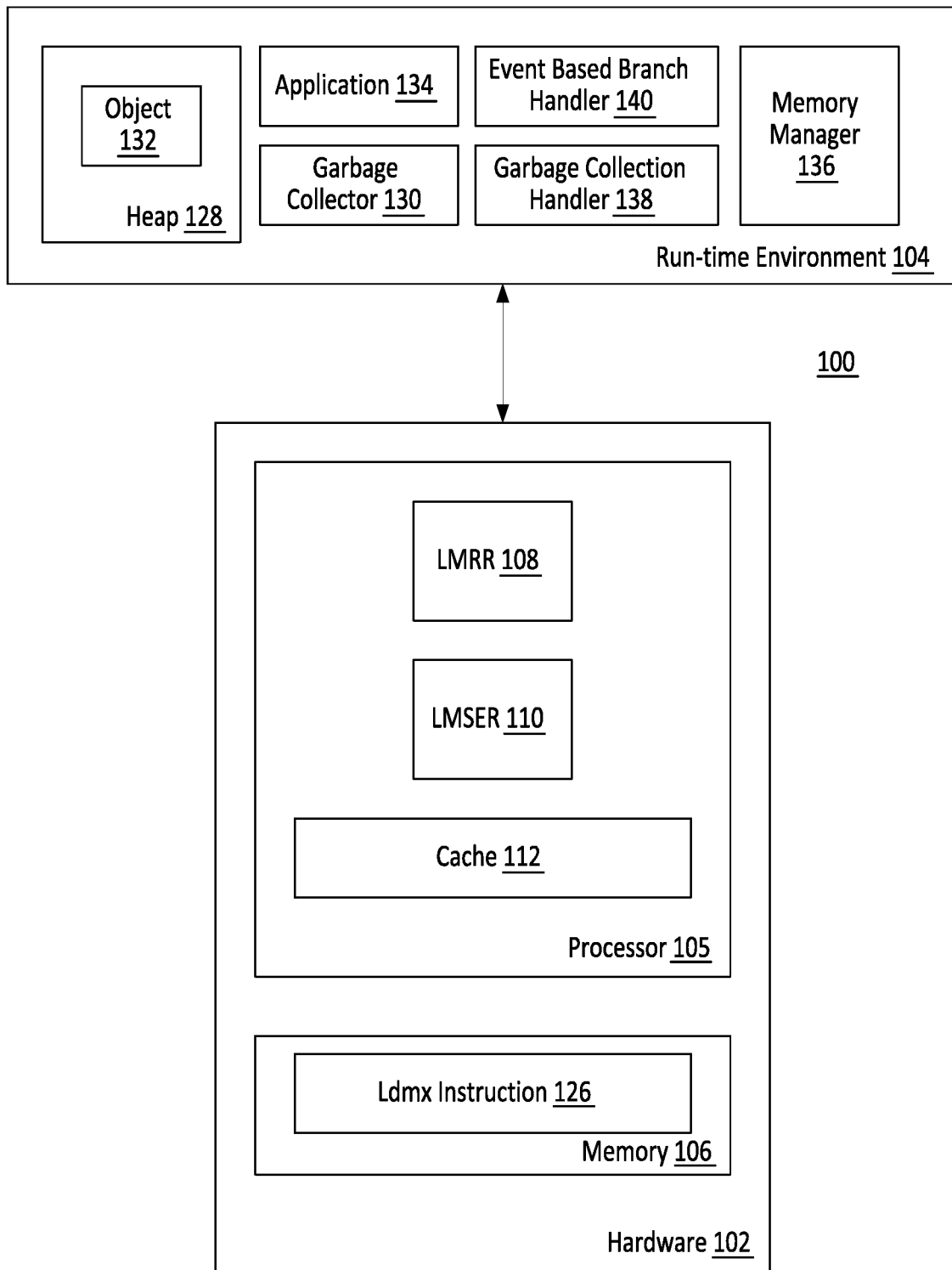
FIG. 1 illustrates a computing environment, according to one embodiment disclosed herein.

FIG. 1 illustrates a computing environment 100 according to one embodiment. The computing environment 100 includes hardware 102 and a run-time environment 104 launched by hardware 102. The hardware 102 includes a processor 105 and a memory 106. The processor 105 includes a load-monitored region register (LMRR) 108, a load-monitored section enable register (LMSER) 110, and a cache 112. The processor 105 retrieves and executes programming instructions stored in memory 106 as well as stores and retrieves application data residing in the cache 112. The processor 105 is included to be representative of a single processor, multiple processors, a single processor having multiple processing cores, and the like.

The memory 106 includes program code instructions for application(s) and/or run-time environment 104. Some of these program code instructions may be a load doubleword monitored (ldmx) instruction 126. The ldmx instruction 126 behaves similarly to a load doubleword instruction in that the ldmx instruction 126 loads the doubleword referenced by the instruction into a register. However, in the case of the ldmx instruction 126, the processor 105 also checks if the data loaded by the ldmx instruction 126 is a memory address that is in a block of user address space that is currently in the process of garbage collection.

The load-monitored region register 108 is a user-accessible register that indicates a block of user address space that is monitored as a target region for load instructions (referred to herein as a "load-monitored region" (LMR)). In some embodiments, the load-monitored region may be a block of user address space that is currently in the process of garbage collection. An event-based branch is triggered whenever the ldmx instruction 126 loads a pointer that points into the load-monitored region specified by the load-monitored region register 108. In one implementation, the load-monitored region register 108 may include a 40-bit base effective address field identifying the starting address of the memory block being monitored (i.e., on which garbage collection is being performed), and a size field indicating the size of the memory block (e.g., 32 MB, 64 MB, 128 MB, etc.)

The load-monitored section enable register 110 is a user-accessible register that allows individual sections within the load-monitored region to be enabled or disabled. The section in the load-monitored region that is currently in the process of garbage collection is the load-monitored section. In one implementation, the load-monitored section enable register 110 may be an N-bit field, where each bit of the register specifies whether a corresponding section within the range indicated by the load-monitored region register 108 is to be identified for garbage collection. Each section may be defined to be 1/Nth of the size of the load-monitored region. For example, each bit of a 64-bit load-monitored section enable register 110 may specify a section having 1/64 of the size of the load-monitored range.

The run-time environment 104 supports execution of one or more applications (e.g. application 134) that provide, for example, web services, database services, and other information technology services that may involve retrieval, processing, and serving of data to one or more users. In one particular embodiment, the run-time environment 104 is a Java Runtime Environment, although it should be noted that other memory-managed environments may be utilized with embodiments of the present disclosure. Memory used by and during execution of application 134 is handled by memory manager 136. Memory manager 136 may allocate memory from a portion of guest physical memory specifically reserved for run-time environment 104, referred to as heap memory.

The run-time environment 104 includes a heap 128, a garbage collector 130, a garbage collection handler 138, and an event-based branch handler 140 to manage one or more objects 132 allocated for the application 134 executing within the run-time environment 104. Garbage collector 130 is a memory manager for run-time environment 104 that attempts to reclaim heap memory occupied by objects in heap 128 that are no longer used by the run-time environment 104. Heap 128 includes a region of memory (referred to herein as "heap memory") reserved for storing one or more data objects (e.g. Java objects) and other data structures utilized during execution of the application 134. When the heap 128 runs out of space or fails to meet a threshold level of memory availability, the garbage collector 130 may initiate a garbage collection process wherein "live" objects are compacted and "dead" objects are cleared to create free space within the heap 128.

The garbage collection handler 138 moves objects in the heap during a background garbage collection process. Objects within the heap may alternatively be moved by the event-based branch handler 140. The decision to move objects in the background garbage collection process rather than during event-based branches that occur as the Java program accesses the objects depends on how frequently the Java program is expected to access the objects. In some applications, however, both the garbage collection handler 138 and the event-based branch handler 140 may move objects.

Figure 2:
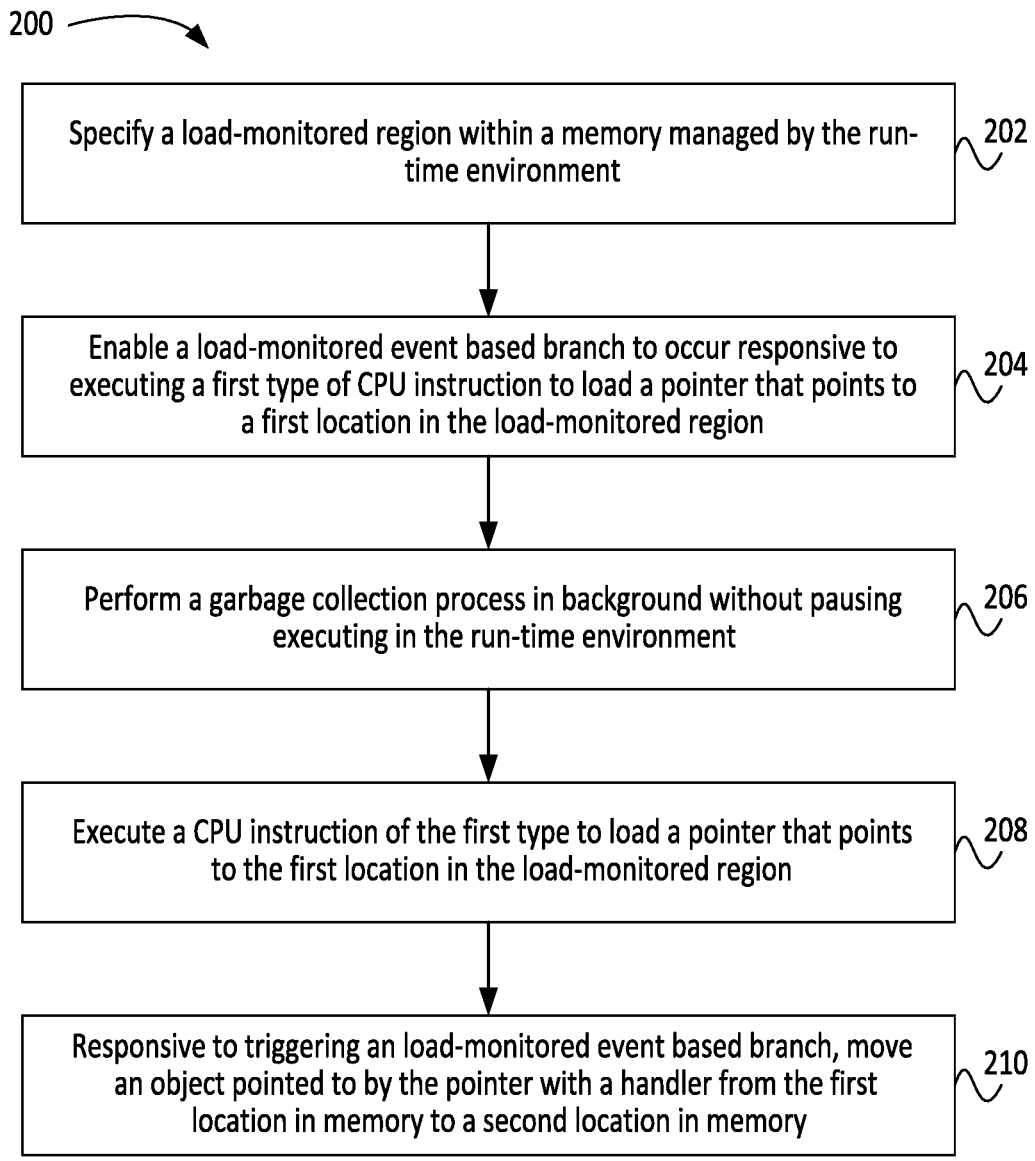
FIG. 2 illustrates a method of garbage collection, according to one embodiment disclosed herein.

FIG. 2 illustrates one embodiment of a method 200 for garbage collection. In one embodiment, the garbage collection process may be run in the background. The method 200 begins at step 202 by specifying a load-monitored region within a memory managed by the run-time environment. For example, the processor 105 may specify a load-monitored region in the heap 128 by indicating a block of user address spaces in the heap 128 in the load-monitored region register. In one embodiment, the load-monitored region specified by the processor is a subset of the heap 128. In another embodiment, the load-monitored region specified by the processor is the entire heap 128. In another embodiment, the LMR specified by the processor is a generation-based area within the heap. A heap may be divided into regions of young, old, and permanent generations. Permanent generation holds static data. The permanent generation holds static data, such as class description, and has its own form of memory management. New objects are allocated into an "eden" space of young generation. For example, the load-monitored region specified by the processor may be the young generation.

At step 204, the processor enables a load-monitored region event-based branch configured to occur responsive to executing a first type of CPU instruction to load a pointer that points to a first location in the load-monitored region. A load-monitored region event-based branch occurs when the processor executes a CPU instruction that reads a pointer that points to a first location in the load-monitored region. The CPU instruction that triggers the load-monitored region event-based branch is the ldmx instruction. In one embodiment, the ldmx instruction is identical to an ldx instruction in Power ISA except that the ldmx instruction causes an event-based branch if the doubleword loaded is in the load monitored region. At step 206, the processor performs a garbage collection process in the background without pausing execution in the run-time environment. At step 208, the processor executes a CPU instruction to load a pointer that points to the first location in the load-monitored region. At step 210, a garbage collection handler moves an object pointed to by the pointer from the first location in memory to a second location in memory in response to the CPU instruction in step 208 triggering a load-monitored event-based branch. Steps 202-210 may be repeated during the garbage collection process.

Figure 3:
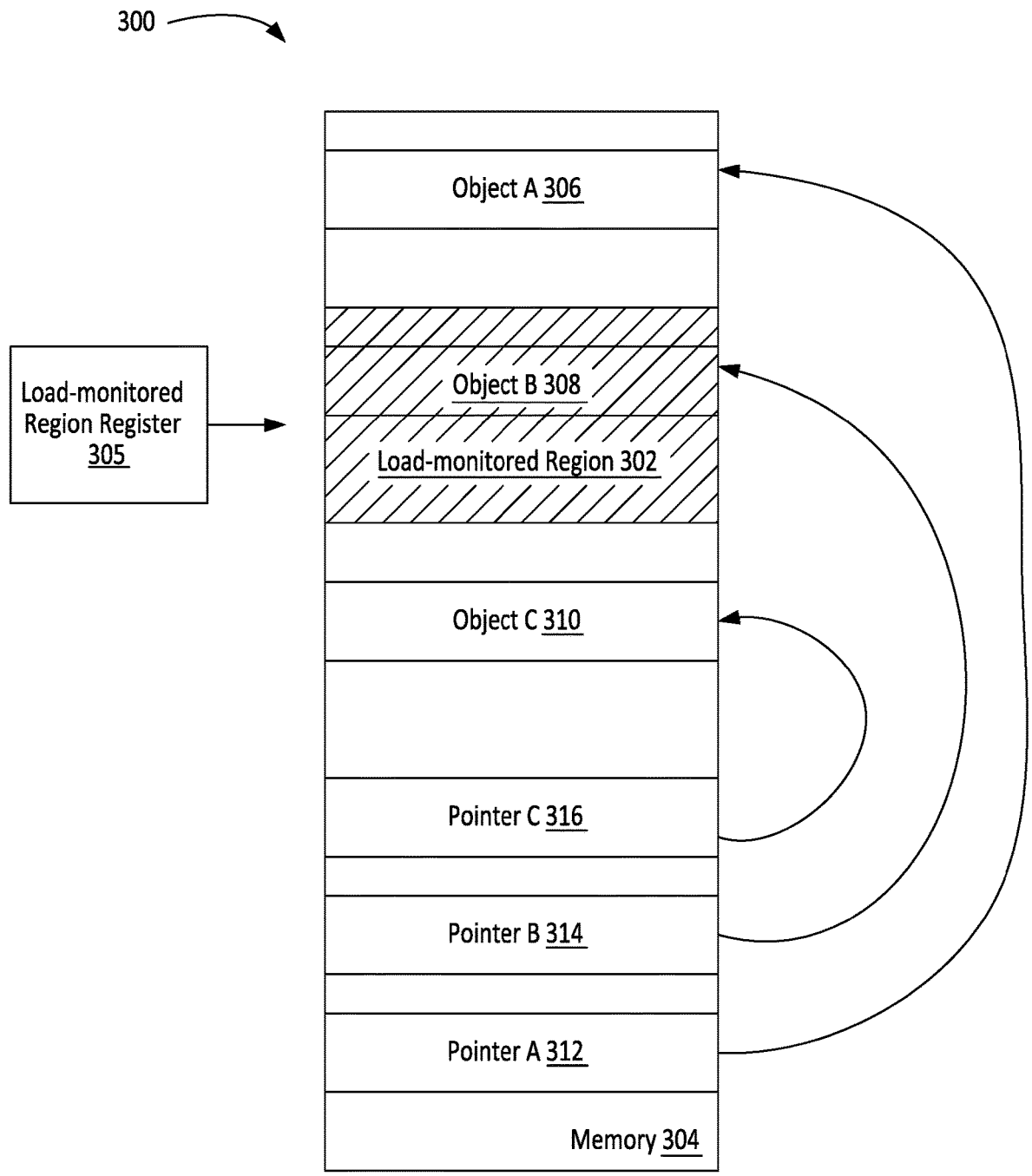
FIG. 3 illustrates an example diagram of enabling a load-monitored region with a load-monitored region register, according to one embodiment disclosed herein.

FIG. 3 illustrates an example of a diagram 300 of enabling a load-monitored region according to one embodiment. The processor specifies a load-monitored region 302 in memory 304 in a load-monitored region register 305. The memory 304 includes object A 306, object B 308, and object C 310 and pointer A 312, pointer B 314, and pointer C 316. The ldmx instruction 126 loads a pointer that points into a first region. For example, ldmx instruction 126 loads pointer A 312 that points to object A 306. The ldmx instruction that loads pointer A 312 that points to object A 306 does not trigger an event-based branch because object A 306 is not within the load-monitored region 302. The ldmx instruction 126 loads pointer C 316 that points to object C 310. The ldmx instruction 126 that loads pointer C 316 that points to object C 310 does not trigger an event-based branch because object C 310 is not within the load-monitored region. The ldmx instruction 126 loads pointer B 314 that points to object B 308. The ldmx instruction 126 that loads pointer B 314 that points to object B 708 does trigger an event-based branch because object B 308 is in the load-monitored region 302.

Figure 4:
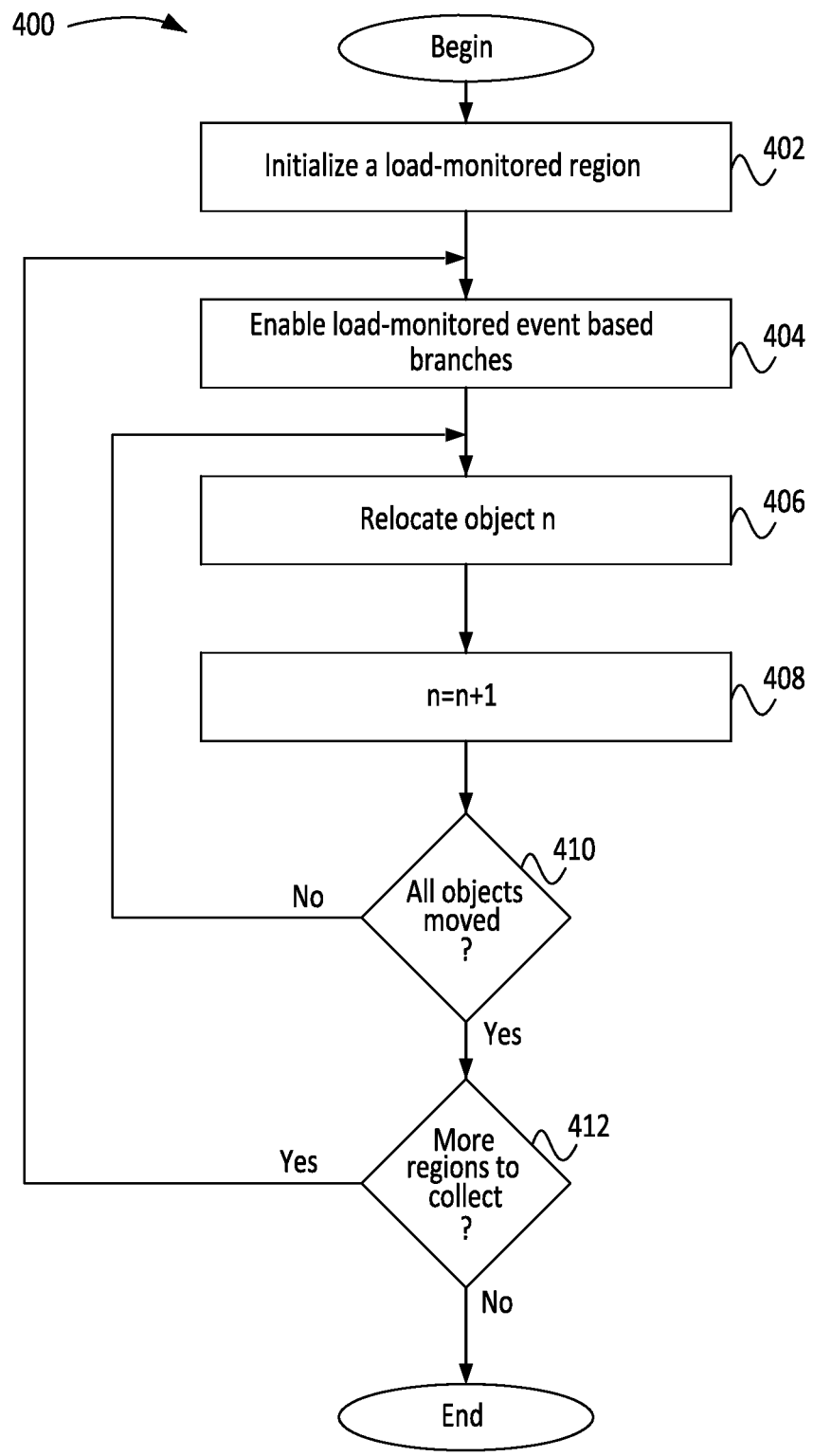
FIG. 4 illustrates a block diagram of a method for garbage collection, according to one embodiment disclosed herein.

FIG. 4 illustrates a block diagram of a method 400 for garbage collection in a run-time environment, such as run-time environment 104. The method begins at step 402 by initializing a load-monitored region within a heap. In one embodiment, an object counter variable "n" is also initiated, where n is a count of the number of objects moved. At step 404, the processor enables a load-monitored event-based branch. This enables the event-based branch to occur when the processor executes an ldmx instruction to load a pointer that points into the load-monitored region. In one embodiment, this is done by setting a load monitored exception (LME) bit in a register, such as a Branch Event Status and Control Register (BESCR). Enabling the load-monitored event-based branch is necessary to allow a garbage collection handler to move objects as they are accessed in addition to the background collection process, and to correct for any race conditions, which may occur if the java application accesses an object that the collector is in the process of moving. At step 406, the collection process relocates an object, n, in the load-monitored region. At step 408, the collection process increments object counter n=n+1. At decision block 410, it determines if all objects in the load-monitored region are not moved, and if not, the method reverts to step 406. If, however, all objects in the load-monitored region are moved, at decision block 412, the processor determines whether there are more regions to collect. If there are more regions to collect, the method reverts to step 404. If, however, there are no more regions to collection, then all memory regions have been consolidated and the garbage collection process is terminated.

Figure 5:
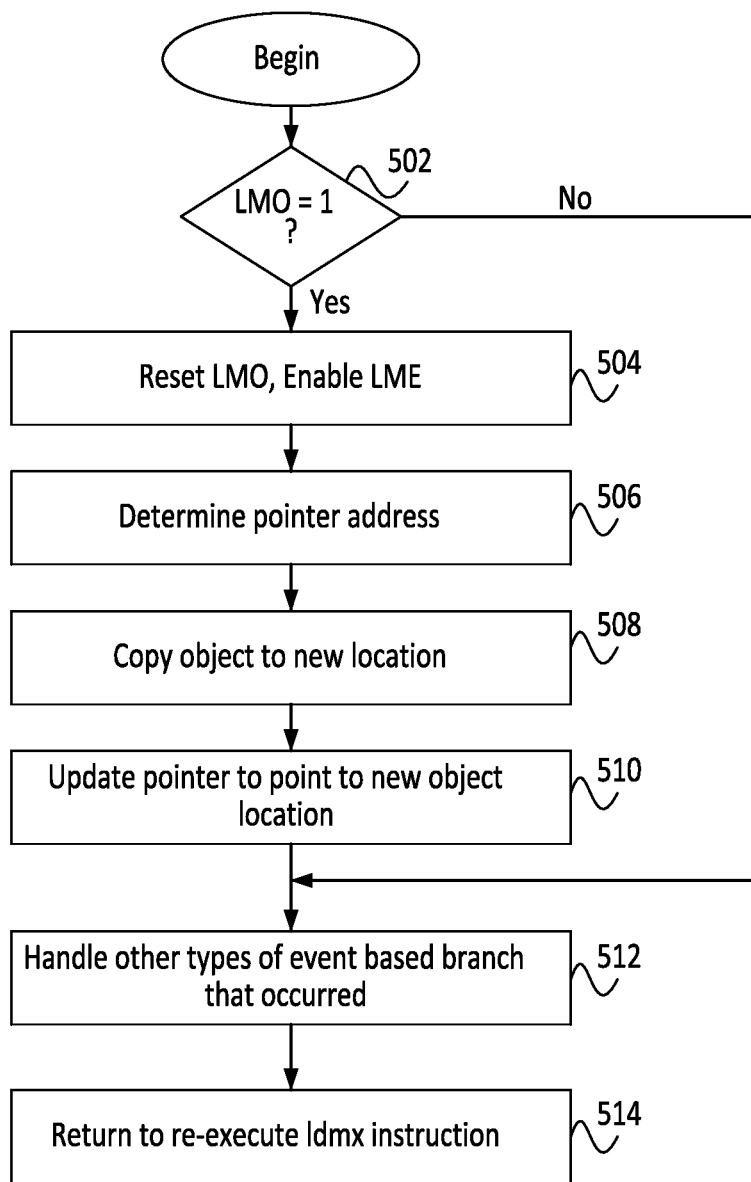
FIG. 5 illustrates a block diagram of an event-based branch hander's processes when an event-based branch occurs, according to one embodiment disclosed herein.

FIG. 5 illustrates a block diagram of an event-based branch handler's processes when an event-based branch occurs. At decision block 502, the processor determines whether the event-based branch was caused by the garbage collection hardware by checking a load-monitored event occurred (LMO) bit in a register such as BESCR in the Power ISA. If the load-monitored event occurred bit does not equal one, an event-based branch event was caused by an event that is not a garbage collection processes, and a garbage collection process does not need to be performed. The method skips to step 512, where the handler will handle other types of event-based branch events that occur. If, however, the load-monitored event occurred bit does equal one, then the event-based branch was caused by an ldmx instruction that loaded a pointer that points into the load-monitored region. At step 504, the load-monitored event occurred bit is reset back to zero, and the load-monitored event enable bit is set back to one to enable the hardware to detect additional executions of ldmx instructions that load pointers into active sections within the load-monitored region.

At step 506, the event-based branch handler determines the pointer address. For example, in one embodiment the event-based branch handler reads the ldmx image and calculates pointer address from the contents of the ldmx source registers. At step 508, the event-based branch handler copies the object pointed to by the pointer in step 506 into a new location in memory. At step 510, the processor updates the pointer so that it points to the object moved in step 508. The event-based branch handler then processes any additional event-based branch exceptions that may exist (e.g. a performance monitor event-based exception) at step 512. When all the additional event-based branch exceptions have been processed, it returns to re-execute the ldmx instruction 514, which will subsequently access the pointer modified in step 510.

When moving objects in the event-based branch handler, objects are moved in the order they are accessed. This results in objects being stored in memory in the order of access, which facilitates caching of the objects by the processor during subsequent accesses. Additionally, by updating the pointer to point to the new object address, further event-based branches will not occur when the object is again referenced because the pointer was updated to point to the relocated object, which may be outside the load-monitored region. Because the handler relocates objects in the order they are accessed, and relocates the objects into contiguous areas of storage, subsequent accesses to the objects will be more amenable to being cached because they are located in storage in the same order as they are typically accessed.

In another embodiment, the event-based branch handler would not move the object pointed to by the pointer, but rather, would emulate an access to the object at its original location. This is done by replacing boxes 508 and 510 with writing the pointer read by the ldmx instruction into the destination register of the ldmx instruction, and returning to the instruction following the ldmx instruction in box 514. This is equivalent to emulating a load instruction that loads the unmodified pointer. In this embodiment, the background collection process would move all objects, and the event-based branch handler would only be necessary to ensure that the object is read from the proper location.

Figure 6A:
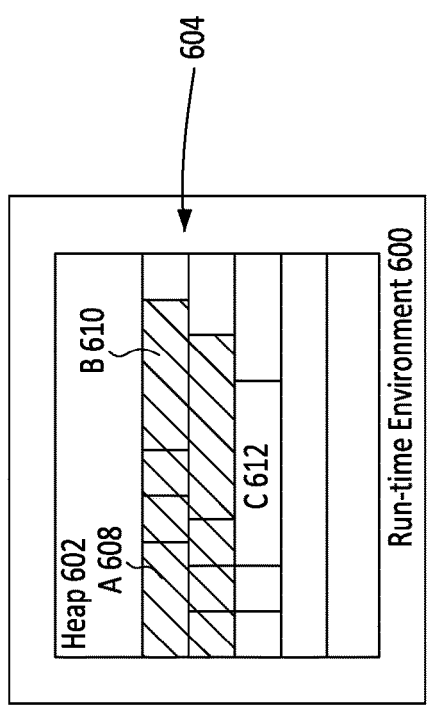
FIGS. 6A-6D illustrate an example garbage collection process, according to one embodiment disclosed herein.

FIGS. 6A-6D illustrates an example garbage collection process according to the above mentioned methods. FIG. 6A illustrates a run-time environment 600 having a heap 602. The heap 602 includes a plurality of objects 604. The load monitored region has been configured to include those objects in the shaded region of the FIGS. 6A-6D. FIG. 6A further illustrates a garbage collection process table 606. The garbage collection process table 606 maintains the progress of moving objects 604 within the collection region. In the garbage collection process table 606, column 1 contains a list of all objects 604 in the region in which objects are being consolidated. Column 2 indicates the address the address of the object before it has been moved to its new location. Column 3 indicates whether the object has been moved, and if so, column 4 indicates the new location of the object. All entries in column 3, in the initial state of the table, indicate that the objects have not been moved.

Figure 6B:
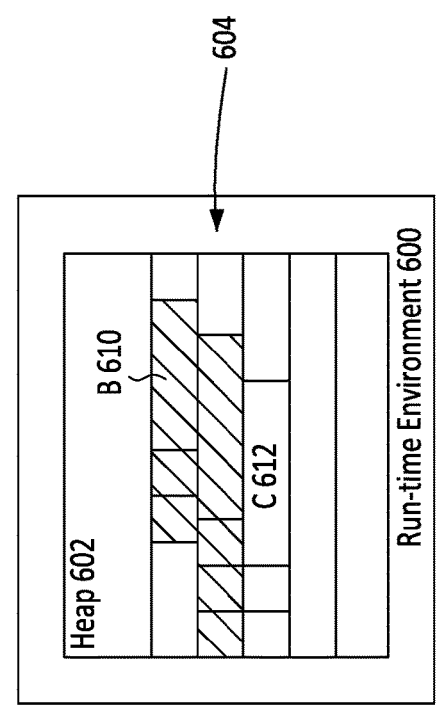

FIG. 6B illustrates the run-time environment 600 and the garbage collection process table 606 after an ldmx instruction loads a pointer that points to a first object. The ldmx instruction loads a pointer that points to object A 608. Because object A 608 lies within the load-monitored region specified by the load-monitored region register, an event-based branch occurs. The handler moves object A 608 from an initial address, addrA.old, to a new address, addrA.new, as depicted in the garbage collection process table 606.

Figure 6C:
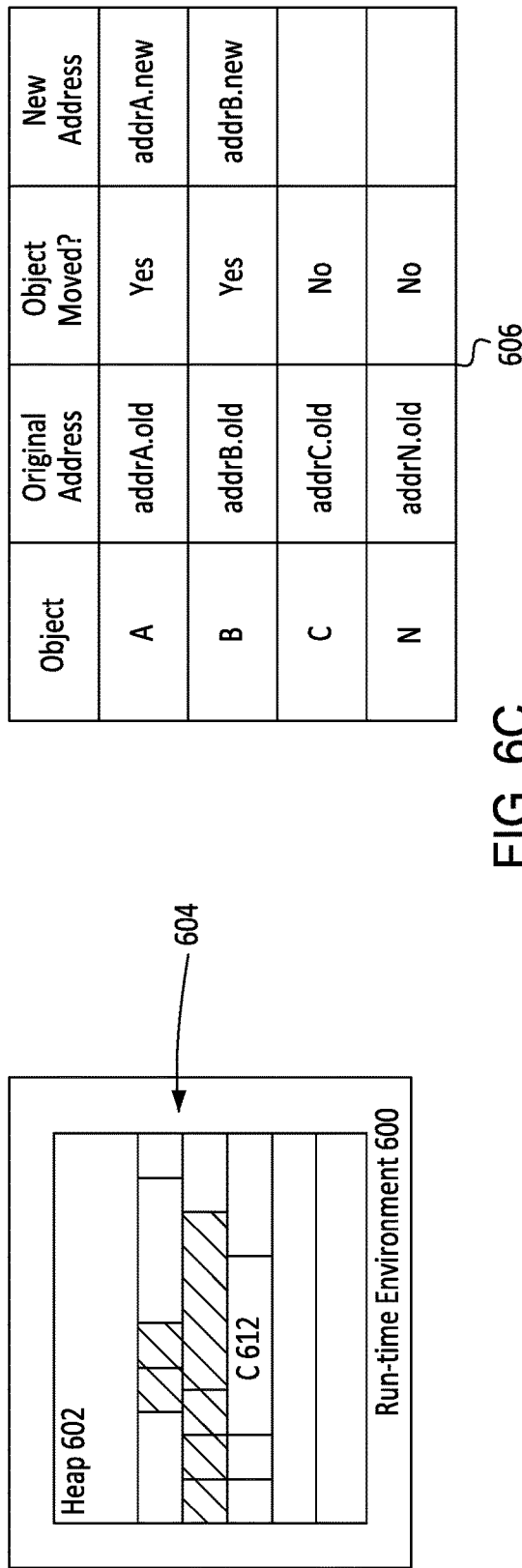

FIG. 6C illustrates the run-time environment 600 and the garbage collection process table 606 after an ldmx instruction loads a pointer that points to a second object. The ldmx instruction loads a pointer that points to object B 610. Because object B 610 lies within the load-monitored region specified by the load-monitored region register, an event-based branch occurs. The event-based branch handler moves object B 610 from an initial address, addrB.old, to a new address, addrB.new, as depicted in the garbage collection process table 606.

Figure 6D:
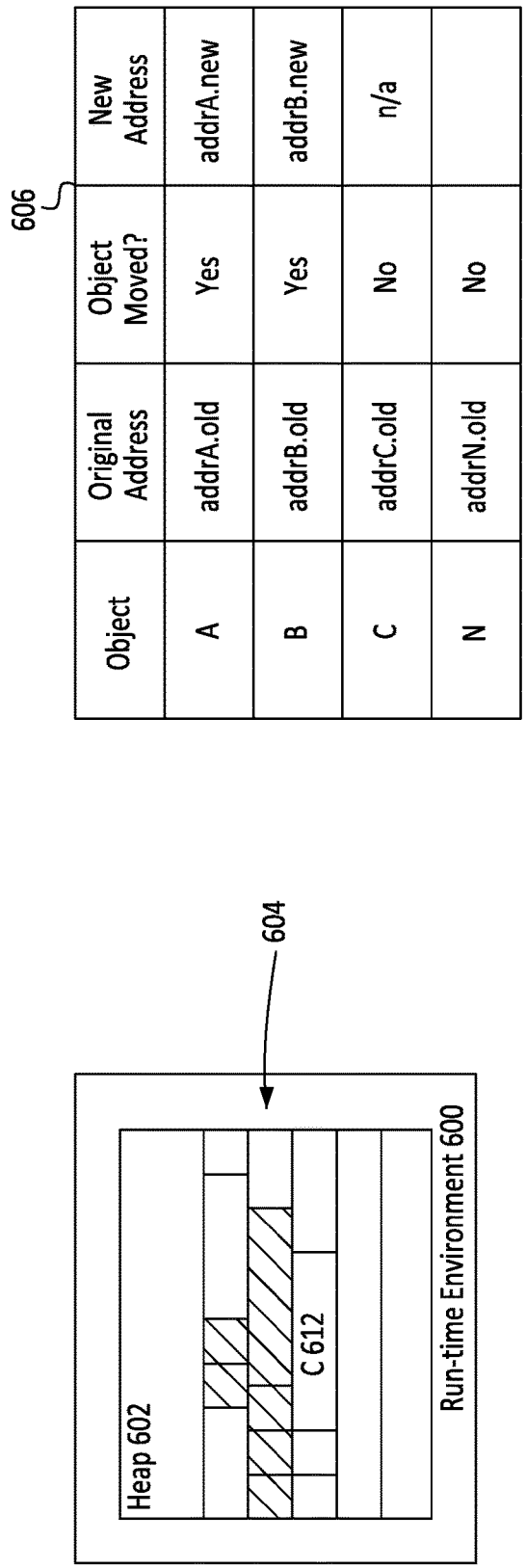

FIG. 6D illustrates the run-time environment 600 and the garbage collection process table 606 after an ldmx instruction loads a pointer that points to a third object. The ldmx instruction loads a pointer that points to object C 612. Because object C 612 does not lie within the load-monitored region specified by the load-monitored region register, an event-based branch does not occur. The event-based branch handler does not move object C 612, as depicted in the garbage collection process table 606. The process may be continued until all objects in the load-monitored region are moved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., garbage collection handler and event-based branch handler) or related data available in the cloud. For example, the handlers could execute on a computing system in the cloud, move objects within the heap, and store the location of the objects within the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
    performing a garbage collection process without pausing execution of a runtime environment;
    executing a first CPU instruction to load a first pointer that points to a first location in a first region of memory, wherein the first region of memory is undergoing garbage collection; and
    responsive to triggering an event based branch, moving a first object pointed to by the first pointer from the first location in memory to a second location in memory.

2. The method of claim 1, the method further comprising:
    specifying a load-monitored region within the memory, wherein the load-monitored region of memory is currently undergoing garbage collection.

3. The method of claim 1, further comprising:
    updating a table that tracks the movement of the first object pointed to by the first pointer from the first location in memory to a second location in memory.

4. The method of claim 2, further comprising:
    loading the specified load-monitored region into a load-monitored region register.

5. The method of claim 4, further comprising:
    enabling a section of the specified load-monitored region into a load-monitored section enable register.

6. The method of claim 1, wherein moving the first object comprises:
    copying the first object from the first location in memory to the second location in memory and updating the first pointer to point to the first object in the second location of memory.

7. The method of claim 2, further comprising:
    executing a second CPU instruction to load a second pointer that points to a third location in the load-monitored region;
    not moving the second object to a fourth location in memory; and
    emulating access to the second object at the third location in memory.

8. A system, comprising:
    a processor:
    a memory storing program code, which, when executed on the processor performs an operation comprising:
        performing a garbage collection process without pausing execution of a runtime environment;
        executing a first CPU instruction to load a first pointer that points to a first location in a first region of memory, wherein the first region of memory is undergoing garbage collection; and
        responsive to triggering an event based branch, moving a first object pointed to by the first pointer from the first location in memory to a second location in memory.

9. The system of claim 8, the operation further comprising:
    specifying a load-monitored region within the memory, wherein the load-monitored region of memory is currently undergoing garbage collection.

10. The system of claim 8, wherein the operation further comprises:
    updating a table that tracks the movement of the first object pointed to by the first pointer from the first location in memory to a second location in memory.

11. The system of claim 9, wherein the operation further comprises:
    loading the specified load-monitored region into a load-monitored region register.

12. The system of claim 11, wherein the operation further comprises:
    enabling a section of the specified load-monitored region into a load-monitored section enable register.

13. The system of claim 8, wherein moving the first object comprises:
    copying the first object from the first location in memory to the second location in memory and updating the first pointer to point to the first object in the second location of memory.

14. The system of claim 9, wherein the operation further comprises:
    executing a second CPU instruction to load a second pointer that points to a third location in the load-monitored region;
    not moving the second object to a fourth location in memory; and
    emulating access to the second object at the third location in memory.

15. A computer readable non-transitory storage medium having stored thereon instructions that when executed by a processor cause the processor to perform an operation comprising:
    performing a garbage collection process without pausing execution of a runtime environment;
    executing a first CPU instruction to load a first pointer that points to a first location in a first region of memory, wherein the first region of memory is undergoing garbage collection; and
    responsive to triggering an event based branch, moving a first object pointed to by the first pointer from the first location in memory to a second location in memory.

16. The computer readable non-transitory storage medium of claim 15, the operation further comprising:
    specifying a load-monitored region within the memory, wherein the load-monitored region of memory is currently undergoing garbage collection.

17. The computer readable non-transitory storage medium of claim 15, further comprising:
    updating a table that tracks the movement of the first object pointed to by the first pointer from the first location in memory to a second location in memory.

18. The computer readable non-transitory storage medium of claim 16, further comprising:
    loading the specified load-monitored region into a load-monitored region register.

19. The computer readable non-transitory storage medium of claim 18, further comprising:
    enabling a section of the specified load-monitored region into a load-monitored section enable register.

20. The computer readable non-transitory storage medium of claim 15, wherein moving the first object comprises:
    copying the first object from the first location in memory to the second location in memory and updating the first pointer to point to the first object in the second location of memory.

* * * * *